United States Patent
Perigord et al.

(10) Patent No.: US 11,760,332 B2
(45) Date of Patent: Sep. 19, 2023

(54) METHOD FOR DIAGNOSING A STATE OF WEAR OF AN AIRCRAFT PARKING BRAKE

(71) Applicants: SAFRAN ELECTRONICS & DEFENSE, Boulogne-Billancourt (FR); SAFRAN LANDING SYSTEMS, Velizy-Villacoublay (FR)

(72) Inventors: Adrien Perigord, Boulogne-Billancourt (FR); Nicolas Lipari, Boulogne-Billancourt (FR); Mathieu Bruno, Velizy-Villacoublay (FR)

(73) Assignees: SAFRAN ELECTRONICS & DEFENSE, Boulogne Billancourt (FR); SAFRAN LANDING SYSTEMS, Velizy Villacoublay (FR)

( * ) Notice: Subject to any disclaimer, the term of this patent is extended or adjusted under 35 U.S.C. 154(b) by 639 days.

(21) Appl. No.: 16/959,861

(22) PCT Filed: Jan. 2, 2019

(86) PCT No.: PCT/EP2019/050041
§ 371 (c)(1),
(2) Date: Jul. 2, 2020

(87) PCT Pub. No.: WO2019/134918
PCT Pub. Date: Jul. 11, 2019

(65) Prior Publication Data
US 2020/0331448 A1      Oct. 22, 2020

(30) Foreign Application Priority Data
Jan. 4, 2018  (FR) ...................................... 1850053

(51) Int. Cl.
*B60T 17/22*         (2006.01)
*F16D 66/02*         (2006.01)
(Continued)

(52) U.S. Cl.
CPC .......... *B60T 17/221* (2013.01); *F16D 66/021* (2013.01); *F16D 2066/006* (2013.01);
(Continued)

(58) Field of Classification Search
CPC ...... B60T 17/221; B60T 17/22; F16D 66/021; F16D 2066/006; G06N 3/08; G06N 20/10; G06N 20/20
See application file for complete search history.

(56) References Cited

U.S. PATENT DOCUMENTS

| | | | |
|---|---|---|---|
| 2003/0061872 A1* | 4/2003 | Giessler | .................... G01L 5/28 73/121 |
| 2012/0221184 A1* | 8/2012 | Pfohl | ...................... B60T 1/062 701/22 |

FOREIGN PATENT DOCUMENTS

| | | |
|---|---|---|
| DE | 10228115 A1 | 1/2004 |
| DE | 10361042 B3 | 5/2005 |

(Continued)

*Primary Examiner* — Sizo B Vilakazi
(74) *Attorney, Agent, or Firm* — MUNCY, GEISSLER, OLDS & LOWE, P.C.

(57) ABSTRACT

The invention relates to a method of diagnosing the state of wear of an actuator including at least one electric motor. The method comprises the following steps: recording a signal coming from the motor during activation and deactivation of the actuator, the signal including a first maximum during activation and a second maximum during deactivation; executing a windowing algorithm on the signal in order to obtain a standardized dataset including the first and second maximums; using at least one classification method for classifying into at least two classes in order to establish a score for the dataset in each of the classes of the classification method; and evaluating the state of wear of the actuator from the scores of the dataset.

15 Claims, 5 Drawing Sheets

(51) Int. Cl.
    *G06N 20/20*     (2019.01)
    *G06N 20/10*     (2019.01)
    *F16D 66/00*     (2006.01)
    *G06N 3/08*      (2023.01)

(52) U.S. Cl.
    CPC .............. *G06N 3/08* (2013.01); *G06N 20/10* (2019.01); *G06N 20/20* (2019.01)

(56) References Cited

FOREIGN PATENT DOCUMENTS

| | | |
|---|---|---|
| DE | 102010029225 A1 | 12/2010 |
| DE | 102011016126 A1 | 10/2012 |
| DE | 102011077786 A1 | 12/2012 |
| EP | 1800809 A1 | 6/2007 |
| EP | 2149721 A1 | 2/2010 |
| WO | WO-02/12043 A1 | 2/2002 |
| WO | WO-2016/184912 A1 | 11/2016 |
| WO | WO-2017/202526 A1 | 11/2017 |

* cited by examiner

| | New | Run-in | Worn | Failed |
|---|---|---|---|---|
| Score A method A | 0.15 | 0.25 | 0.45 | 0.15 |
| Score B method B | 0.1 | 0.2 | 0.4 | 0.3 |
| Score C method C | 0.05 | 0.15 | 0.6 | 0.2 |

METHOD FOR DIAGNOSING A STATE OF WEAR OF AN AIRCRAFT PARKING BRAKE

The present invention relates to a method of diagnosing the state of wear of an electrical actuator, and particularly but not exclusively, of an actuator of a brake system for an aircraft wheel. The invention also relates to apparatus for implementing such a method.

BACKGROUND OF THE INVENTION

In general manner, an aircraft wheel brake comprises friction elements, some of which are secured to the wheel and others of which are secured to a stator, and a hydraulic brake actuator or "jack" arranged to exert sufficient force on the friction elements to prevent the aircraft wheel from rotating.

When parked, the brake jack is activated by a dedicated control device (referred to herein as the "parking brake system") that is distinct from the device for controlling the brake actuator while landing. The parking brake system includes a hydraulic parking brake selector valve (PBSV) that is controlled by an actuator having two electric motors.

Since the parking brake system might need to be used in an emergency in the event of a failure of the device for controlling the brake while landing, provision is made, as a safety measure, for the aircraft not to be authorized to take off if the parking brake system has failed.

It is accepted that the electric motors controlling the PBSV are the main source of failure in the parking brake system. Maintenance tests are performed that consist in checking that the brake jack moves properly under the control of the PBSV, however they are of limited effectiveness since they serve only to detect a clear failure of one of the electric motors and they do not diagnose the state of wear of the parking brake system. As a result, after performing the maintenance test, a successful outcome does not make it possible to guarantee that the parking brake system is operating properly.

Numerous failures of the parking brake system are thus detected in service, which can lead to flights being delayed or cancelled, at great expense for airlines.

It would therefore be advantageous to be able to plan replacing the actuator before a failure of one of the two electric motors is detected in service, while also taking care to avoid replacing a motor too early, for obvious economic reasons.

OBJECT OF THE INVENTION

An object of the invention is thus to provide means for diagnosing the state of wear of an electrical actuator such as the actuator of an aircraft parking brake system.

SUMMARY OF THE INVENTION

In order to achieve this object, the invention provides a method of diagnosing the state of wear of an actuator including at least one electric motor. The method comprises the steps of:
  recording a signal coming from the motor during activation and deactivation of the actuator, the signal including a first maximum during activation and a second maximum during deactivation;
  executing a windowing algorithm on the signal in order to obtain a standardized dataset including the first and second maximums;
  using at least one classification method for classifying into at least two classes in order to establish a score for the dataset in each of the classes of the classification method; and
  evaluating the state of wear of the actuator from the scores of the dataset.

Performing the windowing algorithm on the data serves to extract relevant data from the signal automatically in a standardized format. The time required to analyze the signal is thus shortened, and the quality of the scores obtained by the classification method is improved since said method can be trained on the basis of data that is comparable.

According to a particular characteristic, the actuator has two electric motors.

According to another particular characteristic, the recorded signal is the power supply current of the electric motor.

In a preferred implementation of the invention, the windowing algorithm comprises the steps of sampling the signal at a determined sampling frequency, of searching for the first and second maximums in the signal, and of defining a first time window around the first maximum and a second time window around the second maximum.

Such a windowing algorithm serves in particular to avoid taking account of the time that elapses between activation and deactivation of the actuator under the control of an operator while the signal is being recorded.

Advantageously, the first and second time windows have time dimensions that are identical. The signal resulting from activation of the actuator and the signal resulting from deactivation of the actuator thus extend over a common timescale.

In particular manner, a weighting factor is applied to the signal specifically in order to be able to compare it with another signal.

According to a particular characteristic, the classification method uses the support-vector machine technique.

According to another particular characteristic, the classification method uses the neural network technique.

According to yet another particular characteristic, the classification method uses the random forest technique.

In a particular implementation of the invention, training of the classification method makes use of a first group of datasets distributed among the classes of said method in order to cover the classification associated with each dataset.

In another implementation of the invention, parameters of the classification method are set by using a second group of datasets in order to improve the level of reliability of the scores established by said method.

In particular manner, the classification method is arranged to perform classification into four classes.

By way of example, the four classes of the classification method are: "new", "run-in", "worn", and "failed".

The invention also provides diagnosis apparatus for performing the method of the invention. The diagnosis apparatus comprises recording means for recording the signal from the electric motor and a calculation unit for executing the windowing algorithm and for performing the classification method.

In particular manner, the apparatus includes a connection device suitable for interposing between an electricity network of an aircraft and the parking brake in order to control the electric motor and/or record the signal from the electric motor of the parking brake actuator.

BRIEF DESCRIPTION OF THE FIGURES

The invention can be better understood in the light of the following description, which description is purely illustrative and nonlimiting, and should be read with reference to the accompanying figures, in which.

DETAILED DESCRIPTION OF THE INVENTION

The invention is described below in application to an aircraft wheel brake. In known manner, such a brake comprises friction elements, some of which are secured to the wheel and others of which are secured to a stator, and a hydraulic brake jack arranged to exert sufficient force on the friction elements to prevent the aircraft wheel from rotating. The brake jack is associated with a parking brake system.

Figure 1:
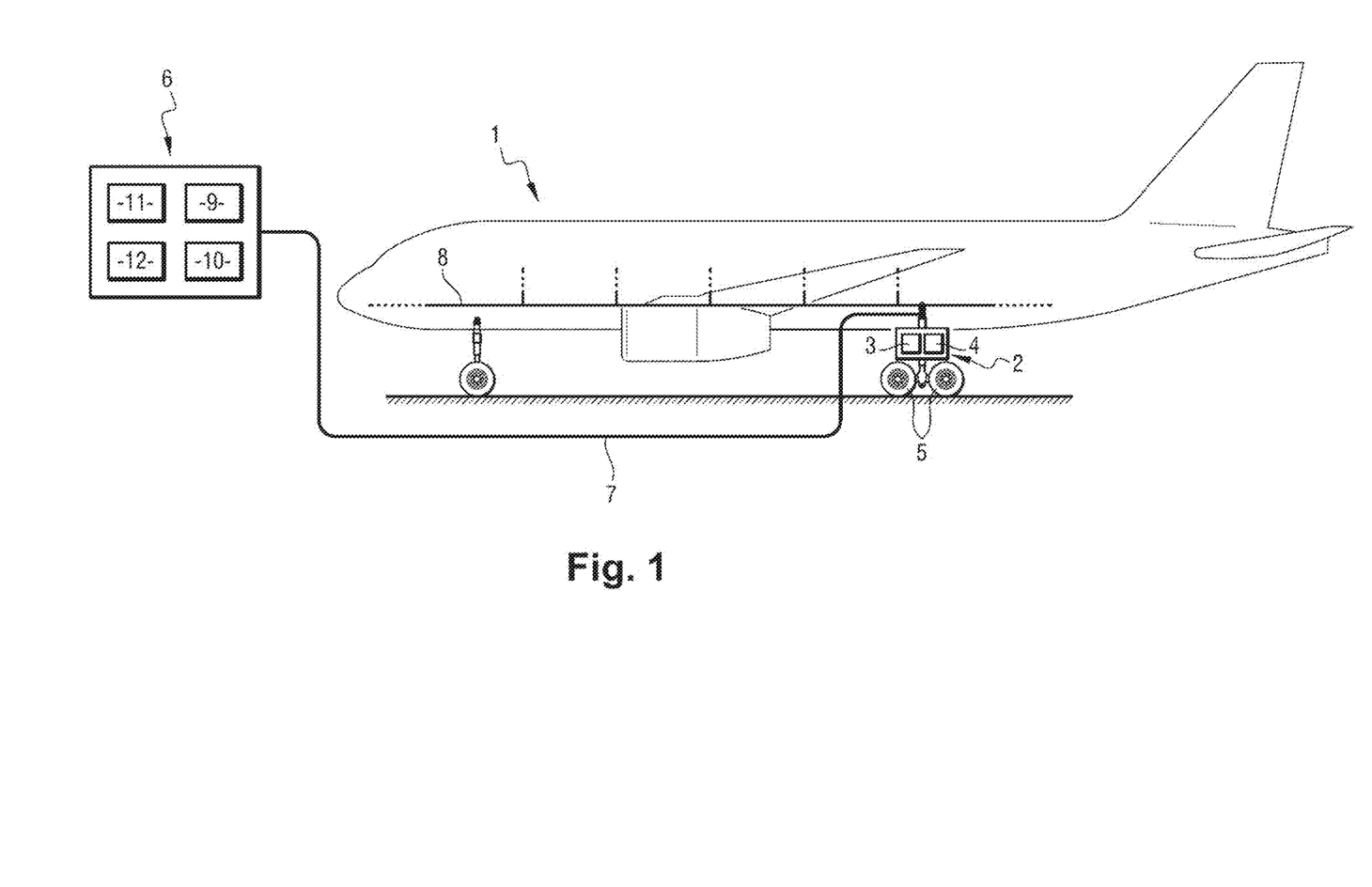
FIG. 1 shows a block diagram of diagnosis apparatus in a particular embodiment of the invention.

With reference to FIG. 1, an aircraft 1 includes a parking brake system 2 comprising a hydraulic selector valve controlled by a first electric motor 3 and by a second electric motor 4. The selector valve controls movement of a jack for exerting forces on the brake friction elements for the purpose of preventing the wheels 5 of the aircraft 1 from rotating.

According to the invention, apparatus 6 for diagnosing the state of wear of a parking brake comprises a connection device 7 that is interposed, during maintenance, between an electricity network 8 of the aircraft 1 and the parking brake system 2. The connection device 7 enables the apparatus 6 to control the motors 3 and 4 of the parking brake system 2 by means of a control unit 9. The apparatus 6 also comprises recording means 10 for recording signals from the motors 3 and 4, and more particularly signals representing the power supply currents for the motors, which signals are picked up by the connection device 7.

The apparatus 6 also includes a calculation unit 11 enabling it to process the recorded signals. Information concerning the processing, and in particular a result of the processing, can be displayed on a display 12.

Figure 2:
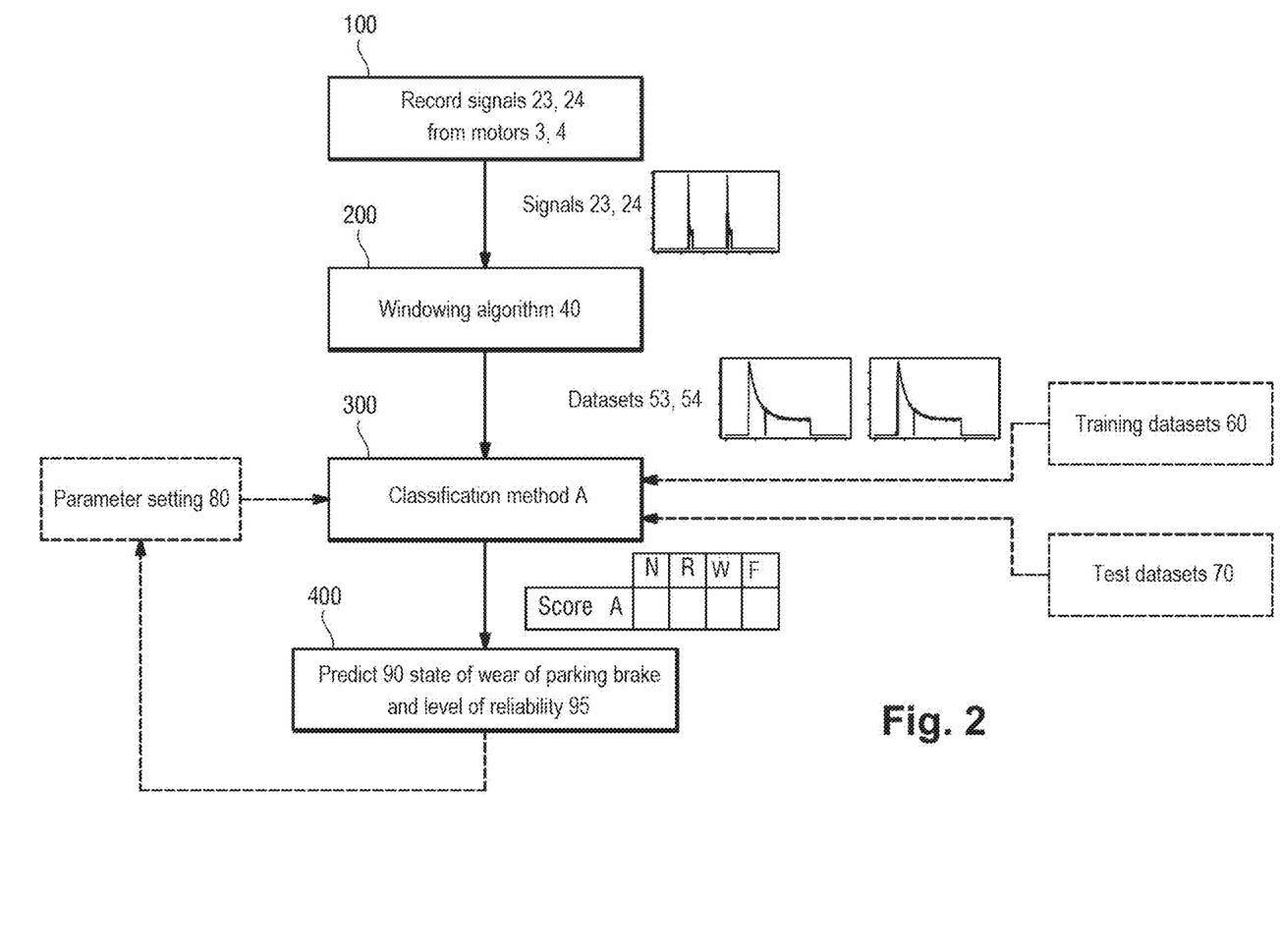
FIG. 2 shows steps of a method in a first implementation of the invention.

In a first implementation of the invention as shown in FIG. 2, the apparatus performs a sequence of operations including a first step 100 that consists in controlling the first motor 3 to activate and deactivate the parking brake 2 in succession while the second motor 4 is inactive, and then controlling the second motor 4 to activate and deactivate the parking brake 2 in succession while the first motor 3 is inactive. In parallel, the apparatus 6 records a first power supply current signal 23 for the first motor 3 and then a second power supply current signal 24 for the second motor 4. The first and second signals 23 and 24 are representative of the forces delivered by the first and second motors 3 and 4 in service, and thus of the wear of the parking brake 2.

Figure 3:
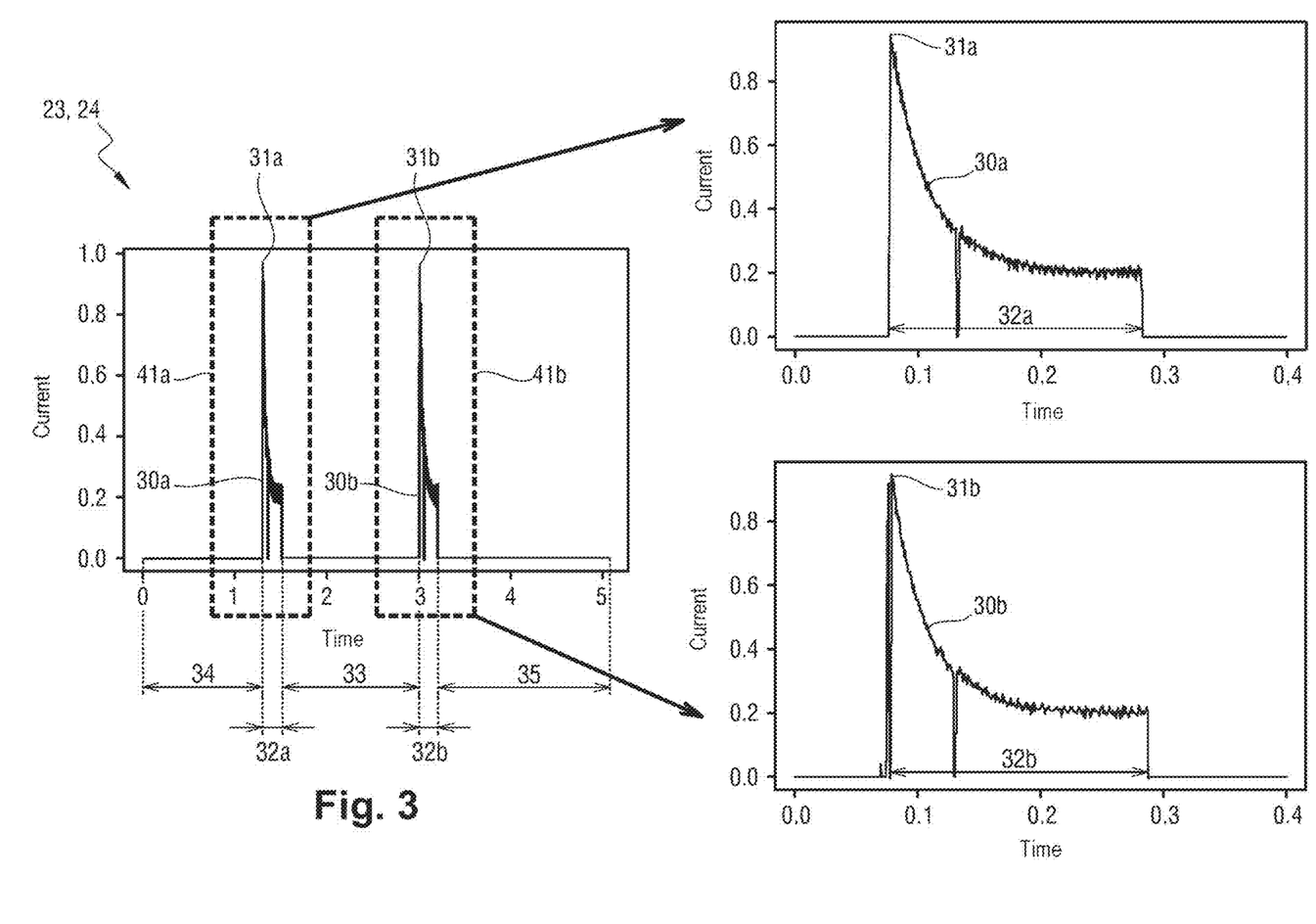
FIG. 3 shows a signal as recorded by the diagnosis apparatus shown in FIG. 1, with a windowing algorithm being applied to the signal.

As shown in FIG. 3, the first signal 23 and the second signal 24 include respectively a first spike 30a and a second spike 30b of generally identical shape in which the power supply current is non-zero. The first spike 30a and the second spike 30b correspond respectively to the parking brake 2 being activated and being deactivated, and they present respectively a first maximum 31a and a second maximum 31b.

The first and second spikes 30a and 30b extend over substantially identical durations 32a and 32b, that are equal in this example to 0.2 seconds (s), corresponding to the time needed respectively for activating and for deactivating the parking brake 2. A duration 33, during which the power supply current is zero, lies between the first spike 30a and the second spike 30b. The duration 33 corresponds to the time that elapses between the end of activating the parking brake and the beginning of deactivating the parking brake. A duration 34 during which the power supply current is zero precedes the first spike 30a. The duration 34 corresponds to the time that elapses between the beginning of recording and beginning of activating the parking brake. A duration 35 during which the power supply current is zero follows the second spike 30b. The duration 35 corresponds to the time that elapses between the end of deactivating the parking brake 2 and ending recording.

Figure 4:
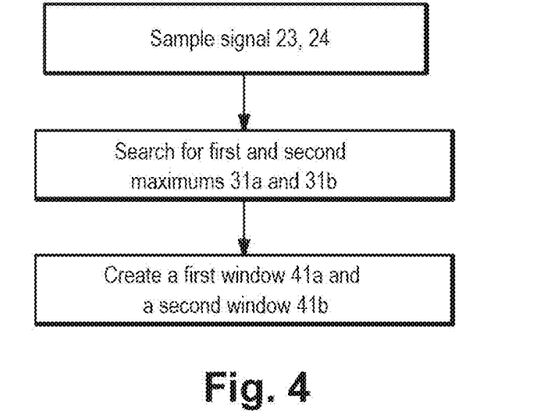
FIG. 4 shows steps of a windowing algorithm.

A second step 200 consists in executing a windowing algorithm 40 on the first signal 23 and on the second signal 24. As shown in FIG. 4, the algorithm consists firstly in sampling the first signal 23 and the second signal 24 at a determined sampling frequency, and then, for said first and second signals 23 and 24, in searching for the first maximum 31a of the first spike 30a and the second a maximum 31b of the second spike 30b in order to define first and second windows 41a and 41b respectively framing the first and second maximums 31a and 31b. The dimensions of the first and second windows 41a and 41b are selected in such a manner that the first and second windows 41a and 41b respectively encompass the first and second spikes 30a and 30b completely and lie between the beginning and the end of the recording under consideration. In this example, the first and second windows 41a and 41b are of identical duration, equal to 0.4 s. The position of the first spike 30a in the first window 41a is substantially similar to the position of the second spike 30b in the second window 41b.

In the event of the first spike 30a or the second spike 30b being non-existent or incomplete, the windowing algorithm 40 warns the operator of a recording error, e.g. by means of the display 12 of the apparatus 6, and proposes taking no account of the recording in question, and starting recording again.

The windowing algorithm 40 thus serves to transform the first signal 23 and the second signal 24 automatically into a first dataset 53 and a second dataset 54, which datasets are standardized and therefore capable of being compared with each other and also from one parking brake system to another. The windowing algorithm 40 can also serve to eliminate irrelevant differences between recordings, e.g. such as the time that elapses between the commands for activating and for deactivating the parking brake. If necessary, a weighting factor may be applied to the first signal 23 and/or to the second signal 24 in order to be able to compare them with each other, or with other signals from another parking brake, in particular in the event of the nominal power supply voltage differing from one motor to the other.

The purpose of the windowing algorithm 40 is thus to pre-process the signal in order to eliminate differences in recording so as to facilitate analysis.

A third step 300 consists in analyzing the first and second datasets 53 and 54 by performing a classification method A for classifying them into four classes, each of the classes being representative of a respective state of wear of the parking brake, namely: N=New, R=Run-in, W=Worn, and F=Failed. By way of example, the method may make use of the support-vector machine (SVM) technique, of the neural network technique, or indeed of the random forest technique.

By way of example, the parameters for the SVM technique could be selected as follows:
Kernel=polynomial (selecting a linear kernel is not appropriate, given the distribution of the datasets);
Degree=2 (a positive integer greater than 1 and selected to lie in the range [2:10]);
Type=C (for ease of optimization and speed of calculation);
C=1 (to avoid problems both of high variance and of high bias);
γ=0.005 for about 2000 training datasets (using the parameter γ makes it possible to start from the idea that values close to the inverses of the deciles of a dataset are close to an optimum);
Weighting: N=0.1 R=2 W=2 F=1 (the desire to be able to use a database of training datasets regardless of the distribution of classes requires intervals to be relatively broad in order to be certain of obtaining results of interest).

The purpose of classification method A is to give each of the first and second datasets 53 and 54 a score in each of the classes N, R, W, and F. To do this, classification method A requires a sample of datasets that are distributed in this example into two groups of equal size: A first group of datasets 60, referred to as "training datasets", which are distributed in the classes N, R, W, and F so that classification method A covers the classification that is to be adopted, and a second group of datasets 70, referred to as "test datasets", which are likewise distributed in the classes N, R, W, and F, but in order to verify the level of reliability for the scores established by said method.

In this example, the sample of datasets is taken from parking brakes that have just been produced and parking brakes that have been returned to the workshop for a suspected failure on an aircraft. In this example, the training datasets 60 and the test datasets 70 are distributed manually in the classes N, R, W, and F by an expert in brake systems who is capable of classifying datasets as a function of the waveforms and the amplitudes of the recorded spikes.

The test datasets 70 are also used to improve the level of reliability 95 of classification method A by determining parameter settings 80 for said method that enable the state of wear of the parking brake to be predicted with the smallest possible error rate. To do this, a set of parameter combinations is run through for each of the test datasets 70. The parameter combination presenting the best error rate is then selected. This serves to optimize the parameter settings 80.

Figure 5:
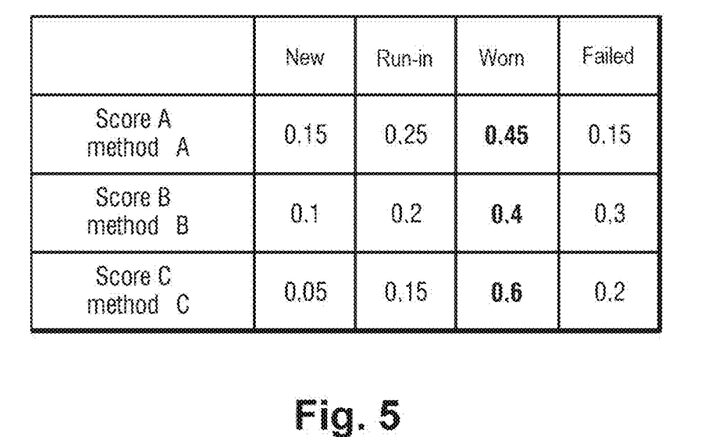
FIG. 5 shows a table of signal scores obtained using different classification methods.

FIG. 5 shows an example of scores for the first dataset as established by classification method A for each of the classes N, R, W, and F. Each of the scores represents the membership percentages of each of the classes N, R, W, and F in the first dataset 23. Thus, it is agreed that the class that obtains the highest score is representative of the wear state of the motor and is thus allocated to the first dataset 23. In FIG. 5, the motor 3 is considered to be worn by classification method A. A prediction 90 for the state of wear of the motor 3 is then determined, and it is associated with the previously calculated level of reliability for classification method A. It should be understood that the state of wear of the first motor 3 combined with the state of wear of the second motor 4 as determined under the same conditions as for the first motor 3 makes it possible, during a fourth step 400, to evaluate the state of wear of the parking brake system 2. It is then possible to decide to replace the first motor 3 and/or the second motor 4.

Figure 6:
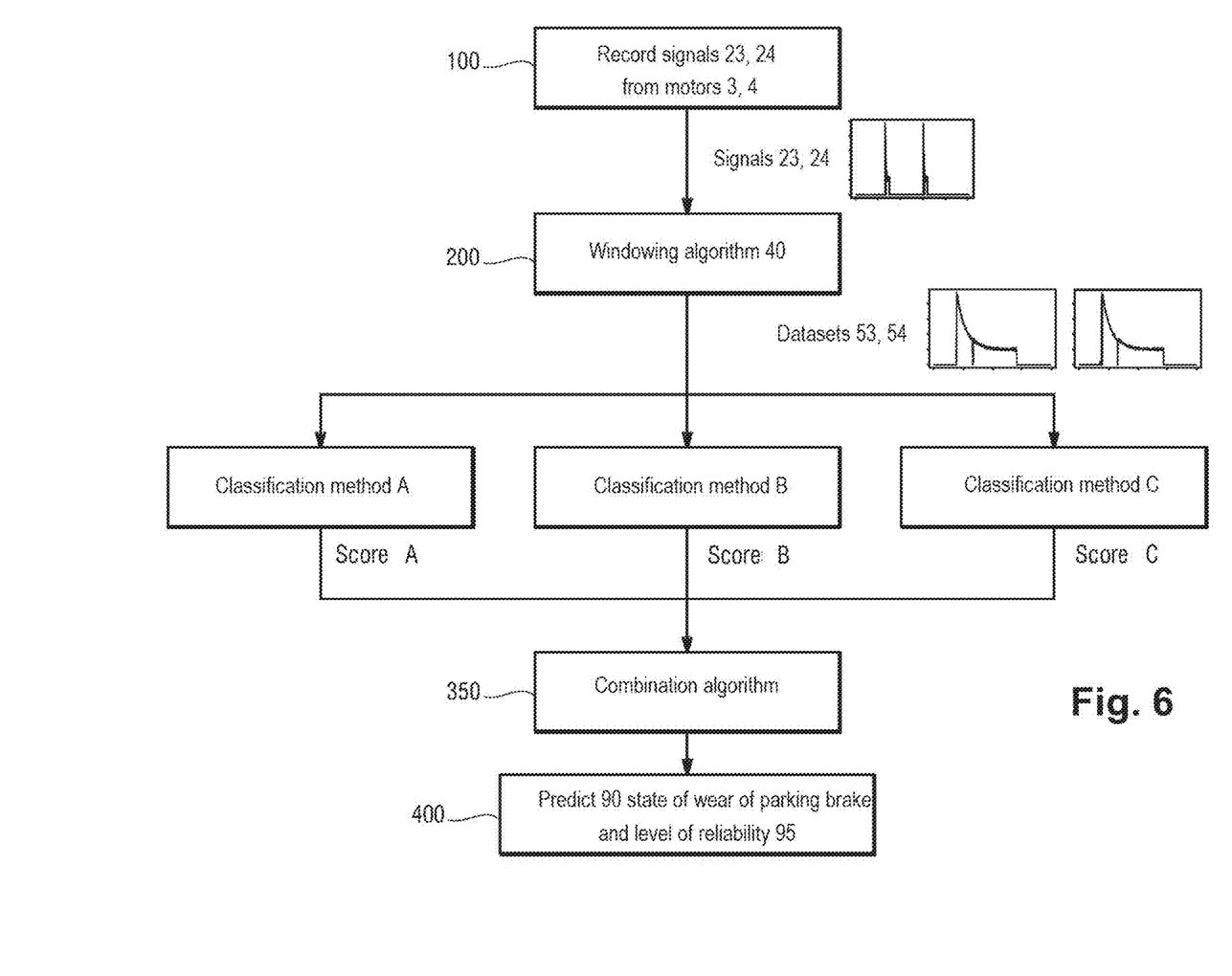
FIG. 6 shows steps of a method in a second implementation of the invention.

In a second implementation of the invention as shown in FIG. 6, it is not just one, but rather three different classification methods A, B, and C that are performed in order to evaluate the state of wear of the parking brake 2. Classification method A uses the support-vector machine technique, classification method B uses the neural network technique, and classification method C uses the random forest technique. Taken separately, each of the classification methods A, B, C presents a prediction rate that is slightly greater than 99%.

The methods A, B, and C are trained and their parameters are set as described above using the same sample of datasets. However, in this implementation the state of wear of the parking brake 2 is determined by combining the scores A, B, and C as obtained respectively by each of the classification methods A, B, and C for the first motor 3 and for the second motor 4.

When the classification methods A, B, and C, which make use of different techniques, all give the same class to a given dataset (as happens on most occasions), the state of wear of the parking brake motor associated with the dataset is then evaluated with a high level of reliability.

When the methods A, B, and C allocate different classes to a given dataset, a combination algorithm 350 allocates a class to the dataset, e.g. by using weighting coefficients for each of the classes N, R, W, and F of the scores A, B, and C on the basis of the known capabilities of each of the classification methods A, B, and C.

When the sum of each of the scores A, B, and C is not identical, the combination algorithm 350 can also make use, in addition to said weighting coefficients, of a function that serves, for each of the classification methods A, B, and C, to bring the scores A, B, and C onto a common scale.

In this manner, the scores of each of the classification methods A, B, and C are mutually comparable and are weighted as a function of their respective reliability levels.

Specifically, when, for example, the classification methods A, B, and C return the scores A, B, and C as given below, the highest score of classification method A does not necessarily give a better prediction for the state of wear of the actuator than the highest score of classification method B or C.

|  | N | R | W | F |  |
| --- | --- | --- | --- | --- | --- |
| Score A | 0.95 | 0.02 | 0.02 | 0.01 | 1 |
| Score B | 0.7 | 0.3 | 0.3 | 0.4 | 1.7 |
| Score C | 0.5 | 0.6 | 0.2 | 0.1 | 1.4 |

A first step of the combination algorithm 350 may then consist in particular in calculating the sums of the scores of each of the classification methods A, B, and C in order to deduce therefrom a coefficient enabling each said sum to be brought to 1. This produces the following recalculated scores A', B', and C':

|  | N | R | W | F |  |
| --- | --- | --- | --- | --- | --- |
| Score A' | 0.95 | 0.02 | 0.02 | 0.01 | 1 |
| Score B' | 0.41 | 0.18 | 0.18 | 0.24 | 1 |
| Score C' | 0.36 | 0.43 | 0.14 | 0.07 | 1 |

Nevertheless, the scores A', B', and C' are not always directly comparable from one classification method to another. For this purpose, during a "normalization" second step, the combination algorithm 350 can apply respective functions to each of the scores A', B', and C' that depend, for each of the classification methods on the class for which the score is the highest. The function, also referred to as a "correction" function, is defined as a function of the results obtained on the training datasets and it serves to bring the scores A', B', and C' onto a single scale. Thus, once corrected, the scores A', B', and C' become directly comparable from one classification method to another.

During a third step, it is then possible to qualify and compare the capabilities of each of the classification methods for correctly recognizing the class that corresponds to the real state of the actuator:

high probability of detecting the class that corresponds to the real state of the actuator; and low probability of allocating a class that does not correspond to the real state of the actuator ("false positive").

It is thus possible to apply single weighting to all of the corrected scores A', B', and C' of each of the classification methods. The weighting depends on the class for which the score is the highest and said weighting can be defined as a function of the training datasets.

By way of example, the combination algorithm 350 can thus calculate the level of reliability of each of the classes allocated by a given classification method (when classification method A allocates class N, it is right 98.6% of the time; when classification method B allocates class N, it is right 81.3% of the time; etc. . . . ).

Using a plurality of classification methods thus makes it possible to take advantage of specific features of each of the methods and to obtain a final prediction that is both accurate and reliable and that virtually eliminates any risk of classification error and of an unexpected failure of the first motor 3 or of the second motor 4.

Naturally, the invention is not limited to the implementations described but covers any variant coming within the ambit of the invention as defined by the claims.

The sequence of operations performed by the diagnosis apparatus 6 remains unchanged when the number of electric motors controlling the parking brake system 2 is equal to one or is greater than two. The sequence is applied to each electric motor of the parking brake actuator.

Likewise, the sequence of operations carried out by the diagnosis apparatus 6 remains unchanged when the signals 23, 24 from the electric motors 3, 4 present a number of maximums (i.e. a number of spikes) equal to one or greater than two. The windowing algorithm 40 defines as many windows as there are maximums.

Although as described herein it is the diagnosis apparatus that controls the parking brake motors in order to record their signals when they are in service, the motors could be controlled manually by an operator while the signals are being recorded.

A signal other than the motor power supply current could be recorded in order to evaluate the state of wear of the parking brake, e.g. the power supply voltage of the torque from the motors.

Although the diagnosis apparatus described is mobile so as to be suitable for being connected to a plurality of the aircraft, it could equally well be fixed, or even on board an aircraft and dedicated to that aircraft only.

After each use of the diagnosis apparatus, the datasets 53 and 54 may be added automatically to the training datasets 60 in order to improve the scores established by the classification methods A, B, and C.

The invention claimed is:

1. A method of diagnosing the state of wear of an actuator including at least one electric motor, the method comprising the steps of:

recording a signal coming from the motor during at least one activation and/or deactivation of the actuator, the signal including a first maximum during activation and a second maximum during deactivation;

executing a windowing algorithm on the signal in order to obtain a standardized dataset including the first and second maximums;

using at least one classification method for classifying into at least two classes in order to establish a score for the dataset in each of the classes of the classification method; and evaluating the state of wear of the actuator from the scores of the dataset.

2. The method according to claim 1, wherein the actuator has two electric motors.

3. The method according to claim 1, wherein the recorded signal is the power supply current of the electric motor.

4. The method according to claim 1, wherein the windowing algorithm comprises the steps of:

sampling the signal at a determined sampling frequency;

searching for the first and second maximums in the signal; and defining a first time window around the first maximum and a second time window around the second maximum.

5. The method according to claim 4, wherein the first and second time windows have time dimensions that are identical.

6. The method according to claim 4, wherein a weighting factor is applied to the signal.

7. A The method according to claim 1, wherein the classification method uses the support-vector machine technique.

8. A The method according to claim 1, wherein the classification method uses the neural network technique.

9. A The method according to claim 1, wherein the classification method uses the random forest technique.

10. The method according to claim 1, wherein training of the classification method makes use of a first group of datasets distributed among the classes of said method in order to cover the classification associated with each dataset.

11. The method according to claim 1, wherein parameters of the classification method are set by using a second group of datasets in order to improve the level of reliability of the scores established by said method.

12. The method according to claim 1, wherein the classification method is arranged to perform classification into four classes.

13. The method according to claim 12, wherein the four classes of the classification method are: "new", "run-in", "worn", and "failed".

14. Diagnosis apparatus for performing the method according to claim 1, the apparatus comprising recording means for recording the signal and a calculation unit for executing the windowing algorithm and for performing the classification method.

15. The apparatus according to claim 14, including a connection device suitable for interposing between an electricity network of an aircraft and the parking brake in order to control the electric motor and/or record the signal from the electric motor of the parking brake actuator.

\* \* \* \* \*